No. 678,673. Patented July 16, 1901.
J. MATTHEWS.
BICYCLE RACING MACHINE.
(Application filed Aug. 22, 1900.)
(No Model.) 2 Sheets—Sheet 1.
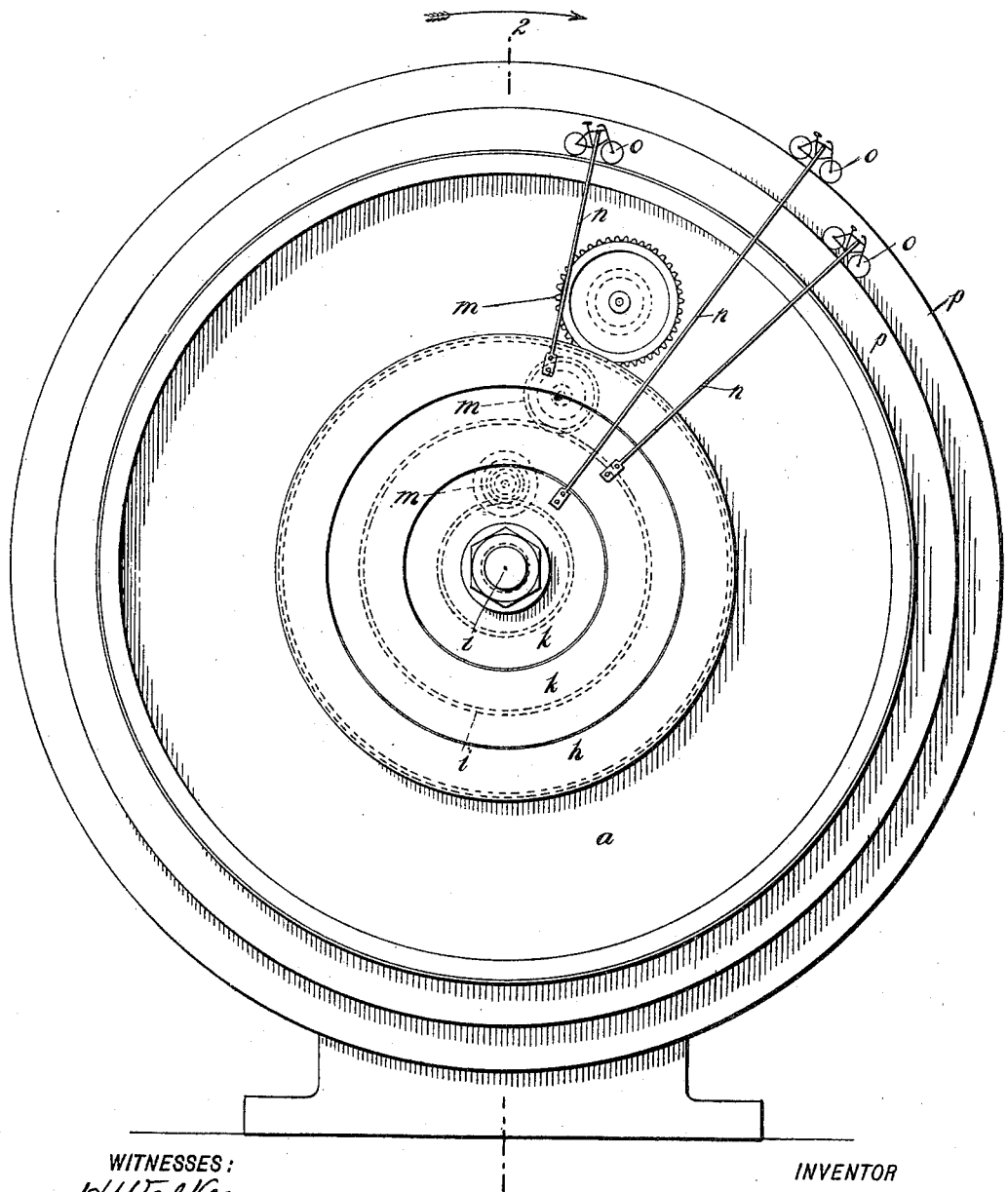

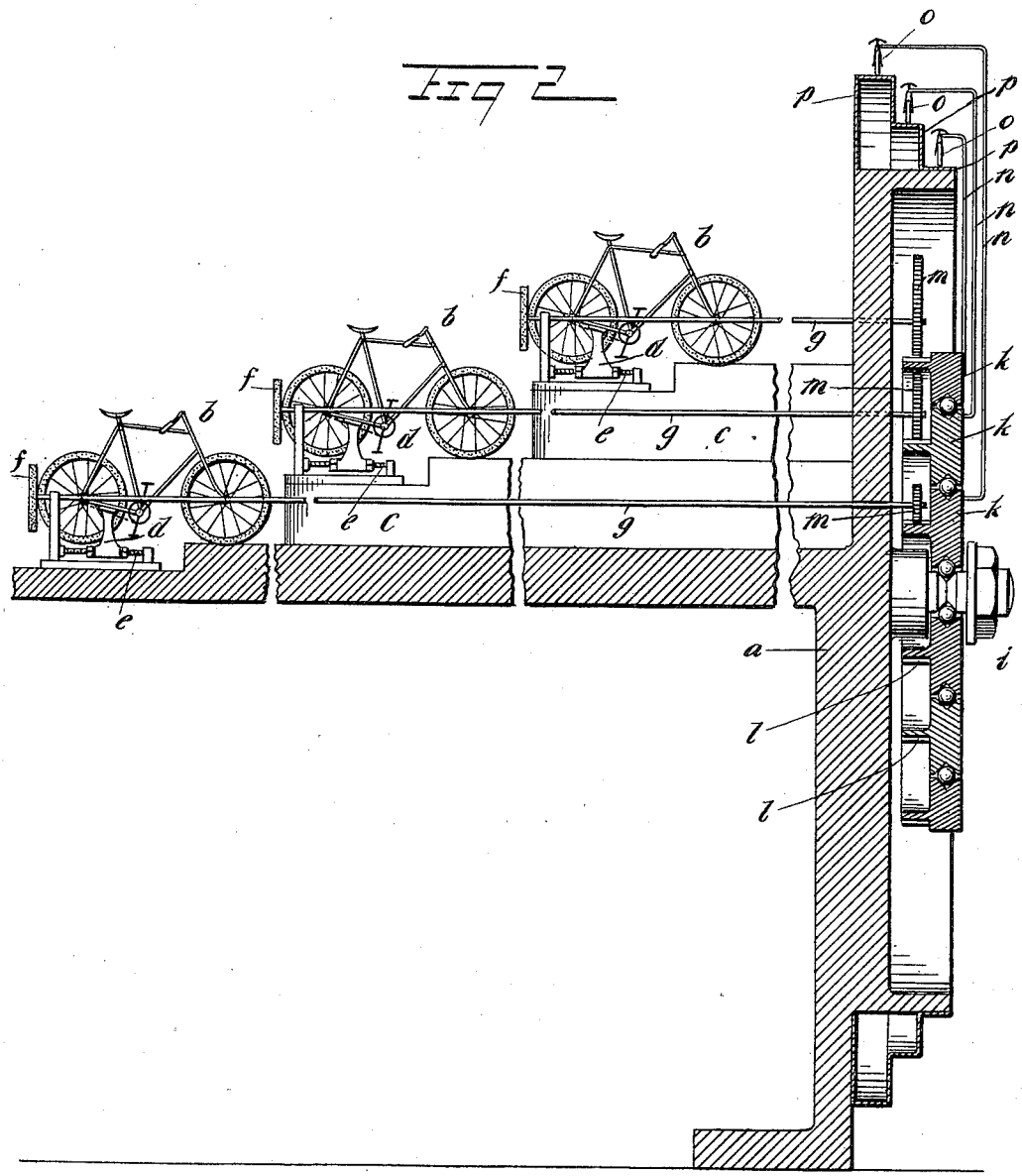

UNITED STATES PATENT OFFICE.

JOSEPH MATTHEWS, OF NEW BEDFORD, MASSACHUSETTS.

BICYCLE-RACING MACHINE.

SPECIFICATION forming part of Letters Patent No. 678,673, dated July 16, 1901.

Application filed August 22, 1900. Serial No. 27,719. (No model.)

*To all whom it may concern:*

Be it known that I, JOSEPH MATTHEWS, a citizen of the United States, and a resident of New Bedford, in the county of Bristol and State of Massachusetts, have invented a new and Improved Bicycle-Racing Machine, of which the following is a full, clear, and exact description.

The purpose of this invention is to provide an apparatus for enabling bicycle-races to be conducted in a limited area and without involving the necessity of the machines actually traveling over the distance supposed to be covered by the race. This end I attain by mounting the machines so that they do not move bodily and by transmitting the movement of a rapidly-spinning driving-wheel to a dummy machine which travels on a small track, and by these means the racing effect is attained.

This specification is the disclosure of one form of the invention, while the claims define the actual scope thereof.

Reference is to be had to the accompanying drawings, forming a part of this specification, in which similar characters of reference indicate corresponding parts in both views.

Figure 1 is a front view of the apparatus, and Fig. 2 is a sectional view on the line 2 2 of Fig. 1.

A suitable framing $a$ is provided, which may be of any sort. It may, indeed, be a part of the building in which the exhibition is held. The bicycles $b$ have their front wheels mounted on suitable supports or stages $c$, and the rear wheels are held off of the floor by means of brackets $d$, which are engaged with the frame and which are adjustable on screws $e$, held on the platforms $c$. The rear wheels of the bicycles engage with friction-gears $f$, mounted on revoluble shafts $g$, as shown, and by these means the shafts $g$ are driven. The force with which the rear wheels of the bicycle engage the friction-wheels $f$ may be regulated by the screws $e$.

A stub shaft or spindle $i$ is mounted on the frame $a$, and this spindle carries a number of concentric annuli $k$, which are independently revoluble and which may, if desired, be fitted with ball-bearings to reduce the friction attending the movement thereof. Each annulus $k$ has a gear $l$ formed on it, and with these gears mesh pinion-gears $m$, respectively carried on the shafts $g$. The gears $m$ are so regulated in point of size that the same speed on the shafts $g$ will transmit equal movement to the annuli $k$. Therefore as long as the bicycles are driven at the same speed the annuli $k$ will move uniformly; but as soon as one bicycle is driven faster than the other the annulus connected therewith will move ahead. Each annulus $k$ carries an arm $n$, and these arms respectively carry dummy bicycles $o$, running around circular tracks $p$, mounted on the frame $a$. The audience does not view the bicycles $b$, but sees only the dummy bicycles $o$, and the racers driving the machines $b$ propel the machines $o$ and by this means the race is reproduced. This enables me to vividly and faithfully reproduce a race in a very limited area without involving the necessity of the riders covering a great space, as would be necessary in an actual race on a track.

Having thus described my invention, I claim as new and desire to secure by Letters Patent—

1. In a bicycle-racing machine, the combination of rotary shafts respectively for transmitting the movement of a plurality of bicycles, a number of annuli mounted one within the other and independently turnable on and in each other, the annuli having gears formed thereon, pinions attached to the shafts and respectively meshed with the gears on the annuli, and indicating devices respectively in connection with the annuli.

2. In a bicycle-racing machine, the combination with means for indicating the speed of the bicycle, of a shaft for transmitting movement to said means, a friction-wheel attached to the shaft, and a sustaining device for holding the traction-wheel of the bicycle raised from the ground and in contact with the friction-wheel, the sustaining device having an adjuster for regulating the pressure of the traction-wheel against the friction-wheel, the adjuster comprising a screw, and a bracket adjustably held thereby so that upon the adjustment of the bracket the pressure of the one wheel against the other may be regulated.

In testimony whereof I have signed my name to this specification in the presence of two subscribing witnesses.

JOSEPH MATTHEWS.

Witnesses:
  WILLIAM CROFT,
  ERNEST DEUHURST.